United States Patent Office 3,781,341
Patented Dec. 25, 1973

3,781,341
DISPROPORTIONATION OF ALKALI METAL SALTS
OF AROMATIC CARBOXYLIC ACIDS
Yu-Lin Wu and Paul S. Hudson, Bartlesville, Okla.,
assignors to Phillips Petroleum Company
No Drawing. Filed June 25, 1971, Ser. No. 156,984
Int. Cl. C07c 63/14, 63/26
U.S. Cl. 260—515 P          6 Claims

ABSTRACT OF THE DISCLOSURE

A slurry comprised of an alkali metal salt of an aromatic carboxylic acid, a disproportionation catalyst, and an inert high-boiling organic dispersant is subjected to heating at an elevated temperature in the presence of a gas atmosphere to form a polycarboxylate having at least one additional carboxyl group.

---

This invention relates to the production of aromatic carboxylic acids from aromatic polycarboxylates. This invention further relates to the production of aromatic polycarboxylates by disproportionation of alkali metal salts of aromatic carboxylic acids.

BACKGROUND OF THE INVENTION

It is well known in the art that alkali metal salts of carboxylic acids having carboxyl groups which are attached to aromatic ring systems can be converted, i.e., transformed, into salts of different carboxylic acids having at least two carboxyl groups in the molecule by heating the said alkali metal salts to elevated temperatures in the presence of a protective gas. It is also known that this transformation is a solid state reaction, that is, the alkali metal salt is heated in the solid state to produce the transformation, called disproportionation, with the product also being in the solid state. This solid state reaction has caused considerable difficulties in the art with respect to its being used in commercial operations. These difficulties include low heat transfer in the reactor and difficulty in the transporting and in the mixing of the reactants and reaction products. In addition, during the solid state reaction the solids fuse together to form large solids, herein referred to as "clinkers," which are extremely difficult, if not impossible, to handle, which foul the reactor causing process interruptions, and which present problems in separation and recovery of the product.

THE INVENTION

It is thus an object of this invention to provide an improved process for the disproportionation of carboxylic acid salts.

Another object of this invention is to provide a process wherein the disproportionation of carboxylic acid salts is conducted in a fluid medium.

Other aspects, objects and the several advantages of this invention will be apparent to one skilled in the art from the following specification and appended claims.

In accordance with this invention, we have discovered that the conversion of an alkali metal salt of an aromatic carboxylic acid to an aromatic polycarboxylate can be conveniently conducted in a slurry system. More precisely, in accordance with this invention the solid reactants and catalyst are dispersed in an inert organic dispersant to form a slurry which is thereafter subjected to the known disproportionation conditions. The slurry of the solid reactants in the organic dispersant thus provides improved handling, mixing and heat transfer properties. Also, the produced solid product is not in a fused form but is instead carried as finely divided particles in the organic dispersant from which the product can be conveniently removed.

There is thus provided an improved disproportionation process for the conversion of an alkali metal salt of an aromatic carboxylic acid to an aromatic polycarboxylate containing at least one additional carboxyl group wherein a slurry comprised of an alkali metal salt of an aromatic carboxylic acid, a disproportionation catalyst and an inert high-boiling organic dispersant is subjected to heating at an elevated temperature in the presence of a gas atmosphere to thus form the desired polycarboxylate product.

The organic dispersant useful herein is one which will not decompose under the conditions of the process, which is inert to the reactants, and which is relatively high boiling. Such organic dispersants include aromatic hydrocarbons selected from the group consisting of polyaromatic compounds having three or more aromatic rings, polynuclear aromatics and mixtures thereof. Examples of such organic dispersants include terphenyls, quaterphenyls, pentaphenyls and heavier polyphenyls; binaphthyls; anthracene, phenanthrene, pyrene, triphenylene, chrysene, perylene, pentacenyl and mixtures thereof.

It is desirable that the organic dispersant remain in the liquid state throughout the process; thus the compound should have a melting point below about 150° C. Mixtures of two or more of the compounds can be utilized to reduce the melting point of the dispersant. It is also desirable that the dispersant have a relatively high boiling point, for example above about 250° C., in order to aid in maintaining the reaction pressure at a low level.

The organic dispersant is present in the slurry in an amount in the range of from 25 to 80 percent by weight of the total weight of the slurry and preferably in an amount in the range of from 60 to 75 percent by weight of the total weight of the slurry.

The slurry is formed by mixing the organic dispersant with the alkali metal salt of the aromatic carboxylic acid desired to be transformed. Any conventional method of mixing a solid with a liquid can be used to form the slurry. For example, if a batch reactor is employed, the dispersant, in liquid form, is added to the reactor, and then the solid salt to be converted, such as potassium benzoate, and a suitable disproportionation catalyst, such as zinc benzoate, both preferably in finely divided form, are added to the reactor while the liquid is being stirred. If a continuous reactor is employed, the solids are metered into a separate stirred mix tank which contains the liquid dispersant wherein the slurry is formed and the slurry is then introduced into the reactor. After mixing, the process proceeds according to the well-known disproportionation process. Thus, the slurry, comprised of an alkali metal salt of an aromatic carboxylic acid and a suitable disproportionation catalyst, is subjected to heating in a gas atmosphere in order to effect the conversion of the alkali metal salt to the desired aromatic polycarboxylate.

In a preferred embodiment, the alkali metal salt of the aromatic carboxylic acid is potassium benzoate, the disproportionation catalyst is zinc benzoate, and the reaction product is dipotassium terephthalate. In addition, in the preferred embodiment, the gas is carbon dioxide. Potassium cyanate, which serves as a promoter for the disproportionation reaction, may also be added but is not required.

In a broader aspect of this invention, as starting materials for the process of this invention, in addition to the presently preferred alkali metal salts of benzoic acid, the salts of other aromatic mono- or polycarboxylic acids can be used. Such salts are those of the formula

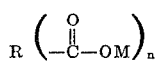

wherein R is an aromatic or alkyl aromatic group having 6 to 15 carbon atoms therein, M is an alkali metal and $n$ is the integer 1, 2 or 3. Such salts are readily prepared from the corresponding acids. Such acids include, for example, benzoic acid, 2-naphthalene carboxylic acid, 4-biphenylcarboxylic acid, 2,6-naphthalenedicarboxylic acid, phthalic acid, isophthalic acid, terephthalic acid, 2-anthracenecarboxylic acid, 1,5-anthracenedicarboxylic acid, 1,5,9-anthracenetricarboxylic acid, 3-phenanthrenecarboxylic acid, 2,3,4-trimethylbenzenecarboxylic acid, 2,4,6-trimethylbenzene-1,3-dicarboxylic acid, 2-ethyl-4-hexyl-6-methylbenzene-1,3-dicarboxylic acid, 2,4-dibutylbenzene-1,3,5-tricarboxylic acid, and the like.

In all of the above-mentioned carboxylic acid salts the aromatic ring may carry alkyl radicals, in addition to the carboxylate groups, provided that these alkyl radical substituents do not bring about a decomposition of the molecule at temperatures equal to or lower than the reaction temperature.

When aromatic monocarboxylic acid salts are used as starting materials for the process according to the invention, the reaction products obtained thereby are industrially valuable alkali metal salts of dicarboxylic acids which can be readily converted to the corresponding dicarboxylic acids; i.e., for example, dipotassium terephthalate is readily converted to terephthalic acid.

The reaction can be carried out with or without transformation catalysts; however, we have found that the reaction according to the invention is favorably influenced by the presence of catalysts. Metals such as zinc, cadmium, mercury, lead, and iron, as well as compounds of these metals such as their oxides and salts formed with inorganic or organic acids and their metal-organic or their complex compounds, among others, their carbonates, bicarbonates, halides, sulfates, formates, phosphates, oxalates, fatty acid salts or the salts of the above metals formed with those acids which may serve as starting materials for the reaction according to the invention or which are formed by this reaction, for example, their benzoates, phthalates or terephthalates, may be used as catalysts.

Preferred catalysts are, for example, iron, lead, zinc, mercury, cadmium, and their compounds, such as oxides, organic and inorganic salts, etc., although other metals and compounds may be used. Such compounds as metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, cadmium isophthalate, cadmium terephthalate, metallic zinc, zinc oxide, zinc iodide, zinc chloride, zinc sulfate, zinc phosphate, zinc carbonate, zinc acetate, zinc soaps, zinc benzoate, zinc phthalate, zinc isophthalate, zinc terephthalate, and other metals and compounds can be used as catalysts.

The amount of catalyst used can vary within wide limits and can range from 0.1 to 100 grams of catalyst per mol of aromatic carboxylate employed, more preferably in the range of 1 to 50 grams per mol. The catalysts can be especially finely divided throughout the reaction mixture by transforming an aqueous solution of the salts serving as the starting materials, which contain the catalysts dissolved or suspended therein, into a dry powder by spray-drying or by other suitable methods. The above-named catalysts can also be used in conjunction with known carriers such as kieselguhr. The catalysts may be used as such or supported on carriers, and may be recovered from the insoluble residues of the reaction and reused in many instances without further purification.

The conversion of the alkali metal carboxylate is effected substantially completely in the absence of oxygen or water. In general, temperatures in the range of about 350 to 500° C. are employed, and more preferably in the range of 400 to 480° C.

The process of this invention can be carried out in a gas atmosphere. Examples of such gases include nitrogen, methane, argon, neon, butane, ethane, helium and the like. In one embodiment of the invention there is utilized an atmosphere which contains additionally at least 50 mol percent carbon dioxide. However, the presence of carbon dioxide in the atmosphere in which the thermal conversion is carried out is not essential to the obtaining of the high conversion of initial reactant. In addition, carbon monoxide or a mixture of CO and $CO_2$ can be used in carrying out the process of the invention.

Pressures in the range of 0 p.s.i.g. to 5000 p.s.i.g. or more can be employed, but it is advantageous and preferable, in keeping with one embodiment of the instant invention, that lower pressures in the range of 0 to 1000 p.s.i.g. be employed.

Sufficient reaction time should be employed to effect the desired degree of conversion. Generally, reaction times in the range of about 1 second to about 48 hours, preferably 5 seconds to 2 hours, are suitable.

In addition, the disproportionation reaction can be promoted by addition of alkali metal salts, preferably potassium salts of derivatives of cyanic acid or its polymers, to the reaction mixture. Suitable polymers or derivatives of cyanic acid are, for example, cyanuric acid, cyanamide and dicyandiamide. The derivatives of cyanic acid are preferably employed in the form of their potassium salts, provided they form salts with alkali metals. In many cases the use of potassium cyanate offers special advantages.

The aromatic polycarboxylates which are produced according to the process of this invention can be recovered from the reaction effluent slurry by extraction with an aromatic solvent such as benzene, toluene, and the like or by an evaporation method whereby the inert organic dispersant is separated from the reaction product by evaporation or sublimation while the reaction products are hot, i.e., 300° C. to 440° C. In addition, the aromatic polycarboxylates can be recovered from the reaction effluent slurry by adding water to the slurry followed by agitation and settling. The water, being substantially completely immiscible with the organic dispersant, separates as a separate liquid phase carrying with it in solution the water-soluble aromatic polycarboxylates. The organic dispersant phase which contains the spent catalyst particles is easily removed from the water phase by conventional phase separation techniques, such as by decantation.

The following examples will enable persons skilled in the art to better understand and practice the invention.

However, the examples are not intended to limit the scope of this invention.

EXAMPLE I

The production of dipotassium terephthalate by the thermal disproportionation of potassium benzoate in a slurry wherein zinc benzoate and potassium cyanate were present as catalyst and promoter was performed. In Example I the reaction temperature was maintained at 440° C. with the reaction being conducted in the presence of carbon dioxide gas. In the reaction system comprising potassium benzoate, zinc benzoate and potassium cyanate, inert organic liquids were used to produce a slurry. The organic liquids used were beta-beta-binaphthyl, para-terphenyl, para-quaterphenyl, and a mixture of ortho-, para- and meta-terphenyl. The results of this example are given below in Table I.

TABLE I
Disproportionation of potassium benzoate to potassium terephthalate in the presence of inert organic material at 440° C. for one hour

| | Gram | | | | | | | TPA (mol percent) | |
|---|---|---|---|---|---|---|---|---|---|
| KBz | ZnBz₂ | KOCN | β,β-Binaphthyl | p-Terphenyl | p-Quaterphenyl | o, m, p-Terphenyl | Carbon¹ dioxide (lb./in.²) | Conv. | Select. |
| 1.0 | 0.10 | 0.07 | 2.0 | | | | 975 | 100 | 87 |
| 1.1 | 0.10 | 0.07 | | 3.0 | | | 800 | 100 | 80 |
| 0.63 | 0.06 | 0.04 | | | 1.8 | | 800 | 100 | 94 |
| 3.0 | 0.15 | 0.15 | | 6.0 | | | 800 | 95 | 92 |
| 3.0 | 0.15 | 0.15 | | | | 6.0 | 800 | 96 | 94 |
| 3.0 | 0.15 | 0.15 | | | | 6.0 | 800 | 94 | 83 |
| 3.0 | 0.30 | 0.15 | | | | 6.0 | 800 | 100 | 91 |
| 3.0 | 0.15 | 0.07 | | | | 6.0 | 800 | 95 | 84 |

¹ Gas pressure measured at room temperature.

NOTE.—KBz=Potassium benzoate; ZnBz₂=Zinc benzoate; KOCN=Potassium cyanate; TPA=Terephthalic acid.

The results in Table I, above, and in Table II, below, are reported in terms of terephthalic acid produced rather than in terms of dipotassium terephthalate because the acid is the ultimately desired final product. The two compounds, however, are equivalent for the purpose of reporting the results herein owing to the 100 percent conversion of dipotassium terephthalate to terephthalic acid in a subsequent metathesis reaction wherein one mol of dipotassium terephthalate is reacted with two mols of benzoic acid to yield one mol of terephthalic acid and two mols of potassium benzoate.

The "Conversion" column refers to the conversion of potassium benzoate and is calculated as follows:

$$\text{Conv. (mol percent)} = \frac{\text{mols KBz destroyed}}{\text{mols KBz in feed}} (100)$$

The "Selectivity" columns refer to the conversion of potassium benzoate to terephthalic acid and this conversion is calculated as follows:

$$\text{Select. (mol percent)} = \frac{2 \text{ (mols TPA produced)}}{\text{mols KBz destroyed}} (100)$$

From Table I it is seen that potassium benzoate is converted to terephthalic acid (dipotassium terephthalate) in high conversions and with high selectivity by conducting the solid state disproportionation of the potassium benzoate in a slurry system using the named organic compounds as dispersants.

EXAMPLE II

In another example, the results obtained using terphenyl as the organic dispersant were compared with the results obtained using an organic medium not within the scope of this invention, i.e., biphenyl; the reaction conditions and results are set out in Table II below. No KOCN promoter was used in these tests.

TABLE II
Reaction conditions:
Heating time=2½ hours
Temperature=440±2° C.
Residence time (at 440° C.)=1½ hours
Carbon dioxide pressure final)=500±5 p.s.i.

| | Gram | | | Terephthalic acid | | |
|---|---|---|---|---|---|---|
| Potassium benzoate | Zinc benzoate | Terphenyl¹ | Biphenyl | Conv. (mol percent) | Select. (mol percent) | Yield (conv. × sel.) |
| 3.0 | 0.30 | 9.0 | | 85 | 71 | 60 |
| 3.0 | 0.30 | 9.0 | | 90 | 72 | 65 |
| 3.0 | 0.30 | 9.0 | | 78 | 81 | 63 |
| | | | | ²84 | ²75 | ²63 |
| 3.0 | 0.30 | | 9.0 | 69 | 77 | 53 |
| 3.0 | 0.30 | | 9.0 | 69 | 71 | 49 |
| 3.0 | 0.30 | | 9.0 | 74 | 72 | 53 |
| | | | | ²71 | ²73 | ²52 |
| 3.0 | 0.30 | | | 76 | 94 | 71 |
| 3.0 | 0.30 | 6.0 | | 78 | 84 | 66 |

¹ The terphenyl used was a commercial product known as Santowax. It consists of a mixture of the para, meta, and ortho isomers of terphenyl.
² Average.

It is clearly seen from Table II that the terphenyl is far superior to the biphenyl as far as conversion, selectivity, and yield of the ultimate product are concerned.

Reasonable variations and modification are possible within the scope of the foregoing disclosure without departing from the spirit and scope thereof.

Having described our invention, that which is claimed is:

1. In a disproportionation process for the conversion of an alkali metal salt of an aromatic carboxylic acid to an aromatic polycarboxylate containing at least one additional carboxyl group comprising heating said alkali metal salt in the presence of a disproportionation catalyst, the improvement which comprises effecting said disproportionation process by heating a dispersion of said alkali metal salt and said disproportionation catalyst in the presence of at least one organic dispersant selected from the group consisting of binaphthyl, terphenyl, and quaterphenyl.

2. The process of claim 1 wherein said organic dispersant is present in said slurry in a liquid form in the amount of 25 to 80 percent by weight of the total weight of said slurry.

3. The process of claim 1 wherein said alkali metal salt is potassium benzoate.

4. The process of claim 3 wherein said gas is carbon dioxide and said catalyst is zinc benzoate.

5. The process of claim 4 wherein said organic dispersant is terpehnyl.

6. The process of claim 5 wherein potassium cyanate is present in said slurry.

References Cited
UNITED STATES PATENTS

| | | | |
|---|---|---|---|
| 3,042,717 | 7/1962 | Schenk | 260—515 |
| 3,023,234 | 2/1962 | Schutt et al. | 260—515 |
| 2,904,587 | 9/1959 | Johnson et al. | 260—515 |
| 2,913,488 | 11/1959 | Blasor et al. | 260—515 |
| 3,096,366 | 7/1963 | Smith et al. | 260—515 |

JAMES A. PATTEN, Primary Examiner